United States Patent Office 3,591,506
Patented July 6, 1971

3,591,506
FUNCTIONAL FLUIDS CONTAINING HALOCARBONS FOR PREVENTING CAVITATION DAMAGE
Robert L. Peeler, Albany, Douglas Godfrey, San Rafael, and Neal W. Furby, Berkeley, Calif., assignors to Chevron Research Company, San Francisco, Calif.
No Drawing. Filed Jan. 4, 1968, Ser. No. 695,553
Int. Cl. C09k 3/00; C10m 1/46; C28f 11/10
U.S. Cl. 252—78
11 Claims

ABSTRACT OF THE DISCLOSURE

Functional fluid containing a cavitation-damage inhibiting additive which is a halocarbon containing from 1 to 6 carbon atoms and boiling below 50° C., wherein the halogen substituents on the halocarbon are chlorine, bromine or fluorine.

BACKGROUND OF THE INVENTION

Functional fluids of various types are employed for numerous purposes. Illustrative of the functions served are lubrication, cooling and quenching, and, most important, energy transmission. In all of these uses, it is quite important that the materials perform their indicated function, e.g., power transmission, and that the fluids themselves do not contribute to either chemical or mechanical attack upon the equipment in which they are employed. Such equipment generally is illustrated by pumps, valves, transmission lines, reservoirs, etc. Chemical attack is usually corrosion, including either oxidative or some other form of chemical attack by the fluid itself upon metal and other surfaces of the equipment. Mechanical attack which often occurs is usually manifested by erosion of the solid parts and ordinarily accompanies cavitation in the fluid. Cavitation results when a fluid at a given pressure moves toward a lower pressure with an accompanying increase in fluid velocity. When the pressure drop reaches a certain level, and the level, of course, varies with the inherent characteristics of the fluid, the fluid cavitates and causes erosive attack upon various parts of the fluid carrying system, usually those parts located downstream from the point at which the pressure drop occurs.

Thus, the effect of cavitation upon the mechanical parts of various systems is often quite severe, and, as well, there also often results breakdown of the functional fluid itself. The effects upon mechanical parts include decrease in strength of various components such as pumps (especially impellers) and valves. Erosion of the valves often results in excessive leaking and possible complete breakdown of the valve with ultimate serious effects. Additionally, the metal fragments which are eroded from the metal parts often enter the fluid and cause decreased lubrication and actual friction wear of many other tightly fitting or moving parts. Other effects which often result include clogging of the filters and as previously noted, degradation of the fluid itself, resulting in short life for the fluid because of increased viscosity, acid number, insoluble materials, chemical activity, etc.

Recent developments in the aircraft industry, with the increased use of high pressure hydraulic systems, have focused attention upon the problem of damaging effects from cavitation. These effects have been especially noticeable in the case of systems which employ phosphate ester fluids. It has recently been disclosed that the operation of a hydraulic system with a completely dry fluid produced greater cavitation damage than when the system was operated with fluid which was contaminated with water. From these facts, it was deduced that the presence of a small amount of water in the system retarded somewhat the damage resulting from cavitation erosion. The effectiveness of water in reducing the damage, however, is somewhat limited and the degree of protection against damage afforded is comparatively small.

SUMMARY

It has now been found that the inclusion of minor amounts of certain relatively low molecular weight halocarbons in functional fluid compositions results in a highly significant decrease in the amount of cavitation erosion and damage to systems in which the fluid compositions are employed.

The halocarbons which are used are those compounds containing from 1 to 6 carbon atoms and boiling between —100° C. and +50° C. The compounds may contain hydrogen, in addition to fluorine, chlorine and bromine or any combination thereof. Iodine substitution is not acceptable due to instability and consequent excessive corrosion. However, the preferred materials contain no hydrogen as the perfluoro and chlorine and bromine substituted perfluoro materials are significantly less flammable than those materials containing hydrogen.

DESCRIPTION

The halocarbons which are employed as cavitation damage reducing agents include saturated or unsaturated aliphatic straight or branched chain, cyclic or acyclic materials.

Examples of suitable aliphatic additives which contain hydrogen include the following:

(1) Methyl derivatives such as methyl chloride, methylene chloride, methyl bromide, difluoro- and trifluoromethane, chlorodifluoromethane, bromodifluoromethane;

(2) Ethane derivatives such as ethyl fluoride, ethyl chloride, ethyl bromide, 1-chloro-1-fluoroethane, 1-chloro-2-fluoroethane, 1-bromo-1-fluoroethane, 1-bromo-2-fluoroethane, 1,1-difluoroethane, 1,1,1-chlorodifluoroethane 1,1,2-trifluoroethane, 1,1-dichloro-2,2-difluoroethane, 1,1,1-bromodifluoroethane, 1-bromo-2,2-difluoroethane, 1-bromo-1,2-trifluoroethane, 1-chloro-2 2-difluoromethane, 1-chloro-1,2,2-trifluoroethane, etc.

(3) Propane derivatives such as 1-chloro-1,2-difluoropropane, 1-bromo-2,2,3,3,3-pentafluoropropane, 1-chloro-1,2,2,3,3,3-hexafluoropropane (1-chloro-1-hydroperfluoropropane), perfluoro-1-chloro-2,2-dihydropropane, etc.

(4) Butane derivatives such as n-perfluoro-1-hydrobutane, n-perfluoro-1, 1-dihydrobutane, n-perfluoro-1-chloro-4-hydrobutane, perfluoro-1-chloro-2 - methylpropane, perfluorohydrocyclobutane, etc.; and (5) Pentane derivatives including n-perfluoro-1-hydropentane, n-perfluoro - 2 - hydropentane, and perfluoromonohydrocyclopentane.

In describing those of the above compounds which contain numerous fluorine substitutions, use has been of the "perfluoro" terminology, and hydrogen substitution for fluorine is indicated by the prefix "hydro."

Suitable unsaturated aliphatic compounds containing hydrogen include 1,1-difluoroethylene, 1,2-difluoroethylene, 1-chloro-1-hydroperfluoro-1-propene, 2 - bromo - 1, 1-dihydroperfluoropropene, etc.

Aliphatic hydrocarbon derivatives containing no hydrogen which may be employed and represent a preferred class because of low flammability include chlorotrifluoromethane, dichlorodifluoromethane, bromotrifluoromethane, chloroperfluoroethane, bromoperfluoroethane, 1,1-dichloroperfluorethane, 1,1 - dibromoperfluoroethane, 1,2 - dichloroperfluoroethane, 1,2-dibromoperfluoroethane, 1-chloroperfluoropropane, 1-bromoperfluoropropane, 1,1 - dichloroperfluoroethane, 1,2 - dichloroperfluoroethane, 1,1 - dibromoperfluoroethane, 1,2-dibromoethane, 1,1,2 - trichloroperfluoroethane, perfluoroethane, perfluoropropane, perfluorocyclobutane, chloroperfluorocyclobutane, n - 1 - chloroperfluorobutane, iso - 1 - chloroperfluorobutane, perfluorobutane, n - 1 - bromoperfluorobutane, n - perfluoropentane, iso - perfluoropentane, perfluorocyclopentane, perfluorohexane, and perfluorocyclohexane.

The above examples are non-limiting and materials described by the boiling point and carbon limitation set forth before are effective. As noted, in many applications, those materials containing hydrogen are suitable; however, in those applications where flame resistance is critical, the preferred materials are the perfluorocarbons and the perfluorocarbons substituted only by other halogens. It will be noted, however, that in general the hydrogen containing halocarbons are relatively flame resistant and since only sinor amounts are employed, no great problem of flammability arises.

The preferred material, because of flame resistance and damage inhibiting properties and commercial availability, is dichlorodifluoromethane.

The amount of cavitation-erosion preventing additive which must be added to each functional fluid in order to effectively prevent cavitation damage depends upon the nature of the particular additive employed as well as that of the functional fluid. The propensity of various fluids for promoting cavitation damage varies greatly with the character of the fluid. For example, mineral oil based materials are generally quite low in promoting cavitation damage while phosphate ester based materials have been found to be quite high in their cavitation damage producing characteristics. Thus, the amount of additive in a phosphate ester will generally be significantly higher than in a mineral oil. Additionally, a limiting factor in the amount of material that may be introduced results from the solubility of the various additives in the various base materials. In general, amounts of from 0.1 to 10 weight percent of the additive are sufficient to prevent cavitation damage in most fluids.

The additives are added by mixing those which are liquid at ambient temperature with the fluid, or, in the case of those which are normally gaseous, by passing the gas through the fluid until the fluid is wholly saturated, or is partially saturated to a degree necessary to control cavitation damage.

During operation of the particular system which is protected by the particular additives, the level of additive necessary to protect the system may be maintained, if necessary, by addition of either liquid or gaseous additives.

Thus, within the scope of the invention is the method of preventing cavitation damage to a hydraulic system or hydraulic fluid by means of maintaining in the fluid a sufficient concentration of the halocarbon to inhibit the damage. The additive may be added incrementally as necessary or may be continuously added by means of a metering device, etc.

The functional fluids in which the additives of this invention are employed include a wide variety of base materials including esters and amides of phosphorus acids, mineral oils, synthetic hydrocarbon oils, silicates, silicones, monoesters, dicarboxylic acid esters, chlorinated biphenyls, esters of polyhydric materials, aromatic ethers, thioethers, etc.

The most common phosphorus acid esters which are used are the triesters of orthophosphoric acid. The three classes of materials are trialkyl phosphates, triaryl phosphates, and mixed alkyl-aryl phosphates. The esters may be represented by the following formula:

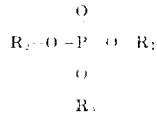

wherein $R_1$, $R_2$ and $R_3$ are alkyl, aryl, substituted aryl, or substituted alkyl groups.

Alkyl groups which may be employed include methyl, ethyl, propyl, isopropyl, n-butyl, isobutyl, sec.-butyl, tert.-butyl, n-amyl, isoamyl, 2-methylbutyl, 2,2-dimethylpropyl, 1-methylbutyl, diethylmethyl, 1,2-dimethylpropyl, tert.-amyl, n-hexyl, 1-methylamyl, 1-ethylbutyl, 1,2,2-trimethylpropyl, 3,3-dimethylbutyl, 1,1,2-trimethylpropyl, 2 - methylamyl, 1,1 - dimethylbutyl, 1 - ethyl - 2 - methylpropyl, 1,3-dimethylbutyl, isohexyl, 3-methylamyl, 1,2-dimethylbutyl, 1,2-dimethyl-1-ethylpropyl, 1,1,2-trimethylbutyl, 1-isopropyl - 2 - methylpropyl, 1-methyl-2-ethylbutyl, 1,1-diethylpropyl, 2 - methylhexyl, 1-isopropylbutyl, 1-ethyl-3-methylbutyl, 1,4-dimethylamyl, isoheptyl, 1-ethyl-2-methylbutyl, n-octyl, 1-methylheptyl, 1,1-diethyl-2-methylpropyl, 1,1-diethylbutyl, 1,1-dimethylhexyl, 1-methyl-1-ethylamyl, 2-ethylhexyl, 6-methylheptyl, n-nonyl, 1-methyloctyl, 1-ethylheptyl, 1,1-dimethylheptyl, 1,1-diethyl-3-methylbutyl, diisobutylmethyl, 3,5-dimethylheptyl, n-decyl, 1-propylheptyl, 1,1-dipropylbutyl, 2-isopropyl-5-methylhexyl, undecyl, n-dodecyl, n-tridecyl, n-tetradecyl, n-hexadecyl, etc.

Substituted alkyl groups may also be employed. Thus the alkyl materials may be substituted with halogens, especially chlorine and fluorine, and with alkoxy groups, etc. Examples of the substituted alkyl groups include butoxyethyl, benzoxyethyl, 2-chloroethyl, 2-fluoroethyl, etc.

Examples of suitable aryl radicals which may be used in the triaryl and mixed alkyl-aryl phosphates include phenyl, xylyl, cresyl and halogenated phenyl. A commonly used halogenated aryl material is orthochlorophenyl.

In addition to the oxy esters of phosphoric acid, amides and thioesters may be employed. The dibasic acid esters which are used as functional fluids, esters derived from sebacic, adipic, and azelaic acids are most commonly used. Suberic, hydroxysuccinic, fumaric, maleic, etc. are sometimes used. The alcohols employed are usually long chain materials such as octyl, decyl, dodecyl, and various oxo alcohols. Short chain alcohols such as butyl, amyl, hexyl, etc. may also be employed. Aromatic alcohols such as benzyl and substituted benzyl alcohols may also be used.

The silicones which are employed as functional fluids may be represented by the following formula:

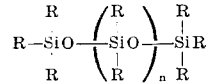

where the R's may be the same or different organic groups. $n$ may represent a small digit or a very large number.

The most important commercial materials are the dimethyl silicone fluids, however, other fluids are available with alkyl, substituted alkyl, aryl and substituted aryl groups. Examples of other available substituents are dimethyl, phenylmethyl, phenyl, chlorophenyl, trifluoropropyl methyl, etc. The siloxanes are available in various lengths from dimers, trimers, etc. to low, medium and high polymers. Thus in the case of dimethyl polysiloxanes, the materials have a molecular weight of from 162 to 148,000.

Silicate esters are also employed as functional fluids. The materials called orthosilicate esters can be considered to be the reaction product of silicic acid, $Si(OH)_4$ and an alcohol or phenol. The structural formula may be represented as follows:

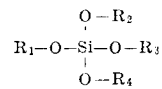

where $R_1$, $R_2$, $R_3$ and $R_4$ are organic groups. Similar to the phosphate esters previously discussed, the materials may generally be classified as tetraalkyl, tetraaryl and mixed alkyl-aryl orthosilicates. The organic groups may be substituted by chloro, nitro, fluoro, alkoxy, and thioalkoxy, etc., groups.

Related materials which are available are called "dimersilicates" and may be named hexaalkoxy or hexaaryloxy disiloxanes. Typical orthosilicates include tetra (2-ethylbutyl), tetra(2-pentyl), tert.-butyl tri(2-ethylhexyl), tert.-butyl tri(2-octyl), tert.-butyl tri(5-ethyl-2- nonyl), di(tert.-butyl) di(2-ethylhexyl), di(tert.-pentyl) di(2-ethylhexyl), di(tert.-butyl) di(2-pentyl), tri(tert.-butyl)-2-ethylhexyl, tetra-n-propyl, tetra-n-1,1,3-trihydropropforyl, tetra-n - 1,1 - dihydropropforyl, tetra-n-butyl, tetra-n-amyl, tetra-n - 1,1,5 - trihydropropforyl, and derivatives.

Another class of functional fluids which may be employed include the polyphenyl ethers. Examples of these materials include bis(p-phenoxyphenyl) ether, bis(o-phenoxyphenyl) ether, bis(m-phenoxyphenyl) ether, m-phenoxyphenyl-p-phenoxyphenyl ether, m-phenoxyphenyl-o-phenoxyphenyl ether, bis(mix-phenoxyphenyl) ether, p-bis(p-phenoxyphenoxy) benzene, mix-bis(mix-phenoxyphenoxy) benzene, bis[p - (p-phenoxyphenoxy)phenyl] ether, m-bis[m-(m-phenoxyphenoxy)phenyl] benzene, and bis[p-(p-phenoxyphenoxy) phenoxy phenyl] ether. (The prefix "mix" indicates a mixture of isomers having varied linkage orientation. See Gunderson et al., Synthetic Lubricants (New York, Reinhold Publ. Co.: 1962), 6. 411, note b.) The phenyl groups and the polyphenyl ether may be substituted by various substituents including methyl, ethyl, n-propyl, iso-propyl, tert.-butyl, n-octyl, cyclohexyl, cyclopentyl, chloro, bromo, hydroxyl, methoxyl, cumyl, etc.

Hydrocarbon oils, including natural mineral oils obtained from petroleum and synthetic hydrocarbons, are also a suitable base material. The mineral oils include a wide variety of naphthenic, paraffin and asphalt base oils.

Synthetic oils which are employed include alkylated waxes, alkylated hydrocarbons of relatively high molecular weight, hydrogenated polymers of hydrocarbons and condensation products of chlorinated alkyl hydrocarbons with aryl compounds. Other suitable oils are those obtained by polymerization of low molecular weight alkylene oxides such as propylene and/or methylene oxide. Still other synthetic oils obtained by etherification and/or esterification of the hydroxy groups and alkylene oxide polymers, such as, for example, the acetate of the 2-ethylhexanol-initiated polymer of propylene oxide.

Mixtures of the above-mentioned fluids may be employed as well as the pure substances.

The following examples serve to illustrate the invention. The examples, however, are but illustrative and are nonlimiting.

EXAMPLE I

Cavitation erosion by phosphate ester fluid

The erosive damage from cavitation by a phosphate ester functional fluid was determined by means of a thin film cavitation apparatus. Briefly, the test involves vibrating an ultrasonic probe within a very small distance of a metal specimen while both probe and specimen are immersed in the subject fluid. Power is applied and the apparatus is allowed to operate for a specified period. The specimen is then removed and weight loss during the test is determined.

More specifically, the apparatus employed is a 0.5 inch diameter ultrasonic probe which is caused to vibrate axially in the liquid at 20 kcs. with an amplitude of approximately 0.0002 inch, with the flat end 0.010 inch from a metal specimen. The probe employed is of the self-tuning piezoelectric type, delivering 92% of the 125-watt power input to the tip. The probe is fastened to the movable portion of a precision way which is mounted on a massive steel post and base. A precision dial gauge allows film thickness adjustment to 0.0001 inch.

The probe and specimen are located within a 50-ml. cell in which the test fluid is placed. For testing with a circulating liquid a cell may be employed which is equipped with an inlet and outlet connected with a 500-ml. reservoir and pump. The metal specimens employed in the following tests were ¼" thick, 1" diameter copper cylinders.

The tests are performed as follows: the copper specimens are abraded on successively finer metallographic polishing paper to 3/0, ending with random scratches, followed by ultrasonic cleaning in hexane and then pentane followed by rapid drying in a blast of warm air to prevent moisture condensation. The specimen is placed in the cell which is filled with the functional fluid sample and the fluid film thickness is set by the use of a feeler gauge. With copper the tests were run for 30 minutes. Specimen damage was measured by weight loss, increased surface roughness, and the observation of discoloration and microscopic pits.

The phosphate ester employed was a material consisting primarily of dibutyl phenyl phosphate (about 70%) containing minor portions of butyl diphenyl phosphate and tributyl phosphate. The fluid contained about 6% of an alkyl acrylate viscosity index improver, minor amounts of corrosion and oxidation inhibitors and a silicone antifoam agent.

The blended ester used in the test had the following properties.

Viscosity, cs:
   100° F. _____ 12
   210° F. _____ 3.9
Specific gravity, 77° F. _____ 1.065
Autogenous ignition temperature, ° F. _____ 1100
Flash point, ° F. _____ 360

TABLE I.—THIN FILM CAVITATION EROSION TESTS EMPLOYING PHOSPHATE ESTER BASE ONE-HALF HOUR WITH COPPER SPECIMEN

| Experiment | Additive Type | P.P., °C., 1 atmos. | G./100 g. concentration | Weight loss, mg. |
|---|---|---|---|---|
| 1a | Dichlorodifluoromethane | −21.6 | 4.81 | 0 |
| 1b | do | −21.6 | 3.85 | 0 |
| 1c | do | −21.6 | 2.4 | 0.4 |
| 1d | do | −21.6 | 0.96 | 8.1 |
| 2 | Chlorodifluoromethane | −40.8 | 9.6 | 0 |
| 3a | 1,2-dichloroperfluoroethane | +3.8 | 12.38 | 0 |
| 3b | do | +3.8 | 2.12 | 5.7 |
| 3c | do | +3.8 | 1.06 | 10.4 |
| 4 | Chloroperfluoroethane | −38.7 | 1.65 | 0.4 |
| 5 | Bromotrifluoromethane | −57.8 | 2.54 | 0 |
| 6 | Chlorotrifluoromethane | −81.4 | 0.43 | 4.8 |
| 7 | Chloropentafluoroethane | −38.7 | 1.65 | 0.4 |
| 8 | Trichlorofluoromethane | +23.8 | 5 | 6.1 |
| 9 | Perfluorocyclobutane | −5.8 | 1.08 | 6.9 |
| 10a | Water | +100 | 0.5 | 11.8 |
| 10b | do | +100 | 1.0–1.5 | 12.9 |
| 10c | do | +100 | Saturated 1.96 | 13.1 |
| 11 | None | | | 15.6 |
| 12a | 1,1,2,2-tetrachloroperfluoroethane | +92.8 | 1.0 | 13.8 |
| 12b | do | +92.8 | 2.0 | 15.7 |
| 12c | do | +92.8 | 5.0 | 18.4 |
| 13 | Methyl chloride | −24.2 | 4.9 | 0 |
| 14 | Methyl bromide | +3.6 | 15.0 | 0 |
| 15a | Trichlorotrifluoroethane | −47.6 | 0.5 | 11.7 |
| 15b | do | −47.6 | 5 | 11.2 |

The tests were performed according to the above procedure with various of the fluorocarbons. Comparison tests were performed on dry fluid and then samples containing water. These data are set forth in the preceding Table I.

It will be noted that these data show that the fluorine-containing additive significantly reduced the damage resulting from cavitation in the phosphate fluids. Note that the dry fluid produced a weight loss of 15.6 mg., water, a damage-reducing additive employed in commercial fluid, reduced the loss to only 12.9 mg., while the more effective of the fluorine-containing materials reduced the loss to almost zero. The high boiling tetrachloro-substituted material in Experiment 11 was relatively ineffective in reducing damage.

EXAMPLE II

Thin film cavitation erosion test with variety of functional fluids

One of the most effective of the anticavitation erosion additives, dichlorodifluoromethane, was tested in a number of typical functional fluids. The identity of the fluids is as follows:

| Fluid | Type | Use |
|---|---|---|
| A | Mineral oil | Gas engine oil. |
| B | do | Diesel oil. |
| C | do | Aircraft hydraulic fluid. |
| D | Silicate ester | High-temperature hydraulic fluid. |

The tests were run under conditions substantially the same as those described in Example I. Iron and copper specimens were employed and in each case the additive was added by bubbling the gas through the base oil for a period of five minutes at 100° F. Bubbling at the rate of 3 bubbles per second was continued throughout the test in order to assure saturation of the fluid. The test results are set forth in the following table:

TABLE II.—THIN FILM CAVITATION TESTS EMPLOYING DICHLORODIFLUOROMETHANE IN VARIOUS BASES

| Experiment | Base oil | Additive | Metal used | Time of run (hours) | Result Wt. loss (mgs.) | Damage |
|---|---|---|---|---|---|---|
| 1 | A | None | Cast iron | 3 | 0.5 | Medium pitting. |
| 2 | A | Yes | do | 3 | 0.1 | Slight pitting. |
| 3 | B | None | do | 3 | 1.1 | Medium pitting. |
| 4 | B | Yes | do | 3 | 0 | None. |
| 5 | C | None | Copper | 0.5 | 3.6 | pitted, rough. |
| 6 | C | Yes | do | 0.5 | 0 | None. |
| 7 | D | None | do | 0.5 | 1.8 | Pitted, rough. |
| 8 | D | Yes | do | 0.5 | 0 | None. |

These data show that although the fluids employed in the absence of an additive caused considerably less cavitation damage than the phosphate fluids, the substituted fluorocarbon was equally as effective in reducing the amount of damage.

The additives are those effective in preventing cavitation damage in numerous applications. Such damage rises not only in hydraulic systems, but in almost any system in which a liquid is pumped under considerable pressure.

In addition to the cavitation erosion inhibitors of this invention, the functional fluids, dependent of the particular use in which the fluid is employed, may contain a variety of additional conventional additives such as oxidation inhibitors, detergents, or dispersants, sludge inhibitors, pour depressants, V.I. improvers, rust inhibitors, oiliness agents, wear inhibitors, antifoaming agents, dyes, etc.

We claim:

1. A power transmission fluid consisting essentially of a major portion of a fluid base selected from the group consisting of an ester or amide of a phosphorus acid, a silicate ester, a silicone, a polyphenyl ether, and a carboxylate ester and having a tendency to cause cavitation erosion damage, and as an additive effective in reducing such damage, about 0.1 to 10 percent by weight of a halocarbon containing only halogen atoms and from 1 to 6 carbon atoms and boiling below 50° C., wherein the halogen substituents on said halocarbons are chlorine, bromine or fluorine or combinations thereof.

2. The fluid of claim 1, in which the fluid base is a phosphate ester.

3. The fluid of claim 2, in which the phosphate ester is a mixed alkyl-aryl phosphate ester.

4. The fluid of claim 1, in which the additive is a halogen substituted perfluorocarbon.

5. The fluid of claim 4, in which the halogen substituted perfluorocarbon is dichlorodifluoromethane.

6. The fluid of claim 4, in which the halogen substituted perfluorocarbon is chloroperfluoroethane.

7. A method of inhibiting cavitation damage to a hydraulic system utilizing a hydraulic fluid consisting essentially of a major portion of a fluid base selected from the group consisting of an ester or amide of a phosphorus acid, a mineral oil, a silicate ester, a silicone, a polyphenyl ether, and a carboxylate ester, which method comprises maintaining in said hydraulic fluid by addition about 0.1 to 10 percent by weight of a halocarbon containing only halogen atoms and from 1 to 6 carbon atoms and boiling below 50° C., wherein the halogen substituents on said halocarbon are chlorine, bromine or fluorine or combinations thereof.

8. The method of claim 7 in which the hydraulic fluid is an ester of a phosphorus acid.

9. The method of claim 8 in which the hydraulic fluid is a phosphate ester.

10. The method of claim 9 in which the hydraulic fluid is a mixed alkyl-aryl phosphate ester.

11. The method of claim 10 in which the hydraulic fluid is dibutyl phenyl phosphate.

References Cited

UNITED STATES PATENTS

| 3,513,097 | 5/1970 | Langenfeld | 252—78 |
| 2,149,937 | 3/1939 | Copley | 252—68 |
| 3,169,928 | 2/1965 | Herold | 252—68 |
| 3,419,658 | 12/1968 | Sanders | 252—305XR |

OTHER REFERENCES

"The Electrochemical Approach to Cavitation Damage and Its Prevention," H. S. Preiser and B. H. Tytell (1961), vol. 17, "Corrosion," pp. 535T–541T.

"Cavitational Erosion and Means for Its Prevention," I. N. Bogachev and R. I. Mints—U.S. Clearing House.

LEON D. ROSDOL, Primary Examiner

D. SILVERSTEIN, Assistant Examiner

U.S. Cl. X.R.

252—49.9, 54.6, 59, 389